Nov. 8, 1927. 1,648,581
O. R. DINSMORE
MOTOR VEHICLE SIGNAL DEVICE
Filed Oct. 29, 1924 4 Sheets-Sheet 1
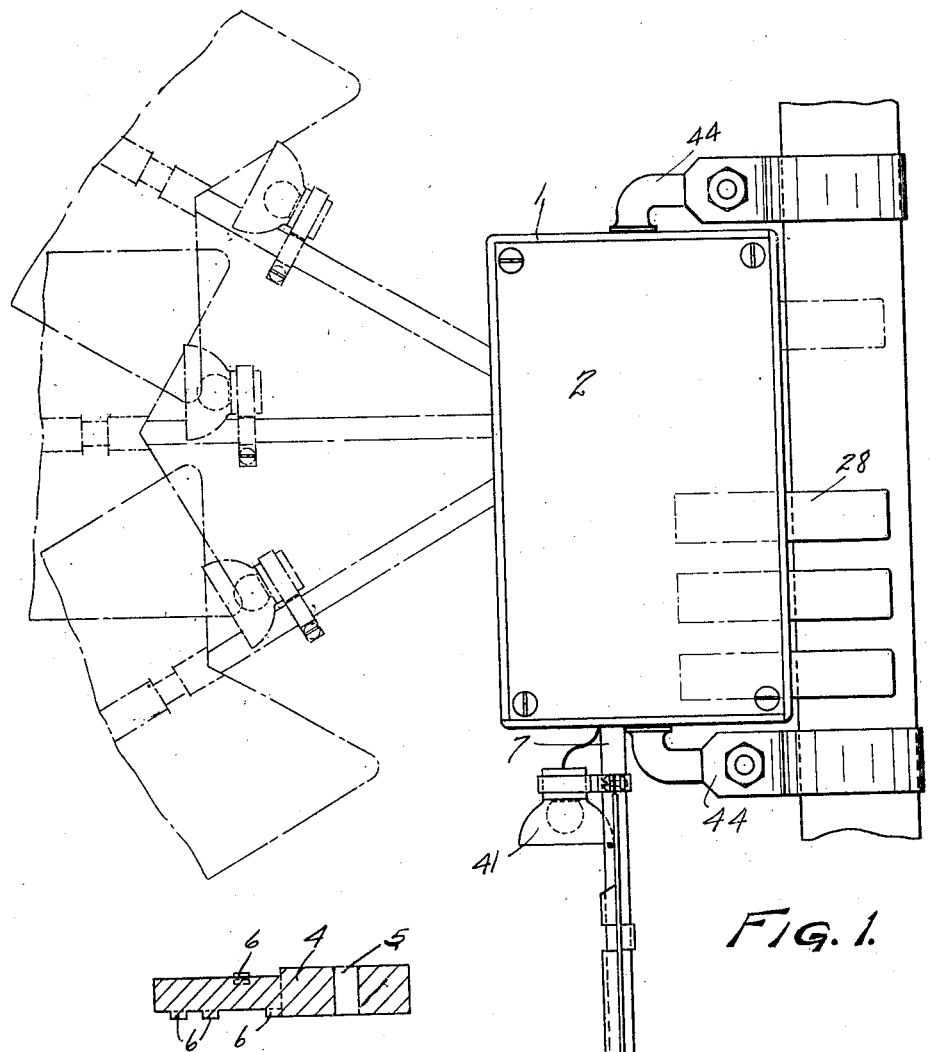
Fig. 1.
Fig. 7.
Fig. 8.
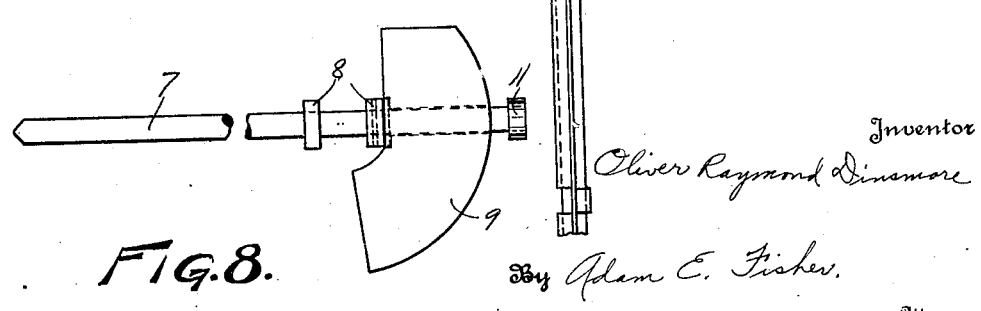
Inventor
Oliver Raymond Dinsmore
By Adam E. Fisher.
Attorney Nov. 8, 1927.  
O. R. DINSMORE  
1,648,581  
MOTOR VEHICLE SIGNAL DEVICE  
Filed Oct. 29, 1924  4 Sheets-Sheet 2

Inventor  
Oliver Raymond Dinsmore  
By Adam E. Fisher.  
Attorney

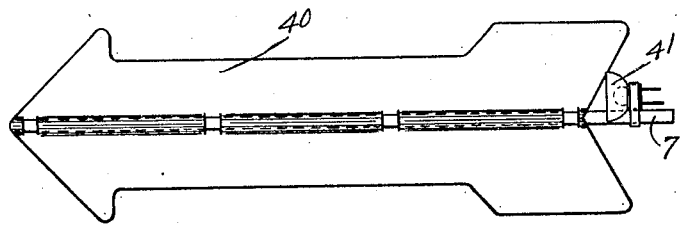
FIG. 6.
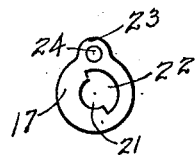 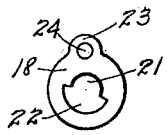 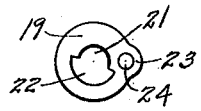 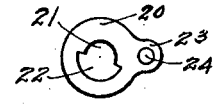
FIG. 9.   FIG. 10.   FIG. 11.   FIG. 12.
 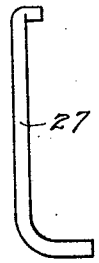 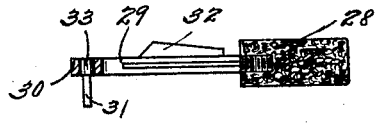
FIG. 16.
FIG. 13.
FIG. 15.
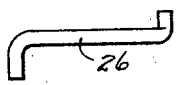
FIG. 14.

Nov. 8, 1927.

O. R. DINSMORE 1,648,581

MOTOR VEHICLE SIGNAL DEVICE

Filed Oct. 29, 1924

Inventor
Oliver Raymond Dinsmore.

By Adam E. Fisher.

Attorney

Patented Nov. 8, 1927.

1,648,581

UNITED STATES PATENT OFFICE.

OLIVER RAYMOND DINSMORE, OF OLYMPIA, WASHINGTON.

MOTOR-VEHICLE SIGNAL DEVICE.

Application filed October 29, 1924. Serial No. 746,467.

This invention is in the way of a signal device for motor vehicles and its main object is to provide a practical and efficient device having an indicator arm actuated by a series of push buttons.

Another object is to provide a device that can be seen by the driver of an approaching vehicle as well as the driver of a vehicle in the rear.

Another object is to provide a signaling device for making signals corresponding to the generally accepted hand signals.

These and other objects will be apparent from the accompanying drawings and specification.

In the drawings

Figure 1 is a rear end elevation of the device as secured to the windshield of an automobile;

Figure 2 is an elevation of the device with the rear cover plate removed;

Figure 2:
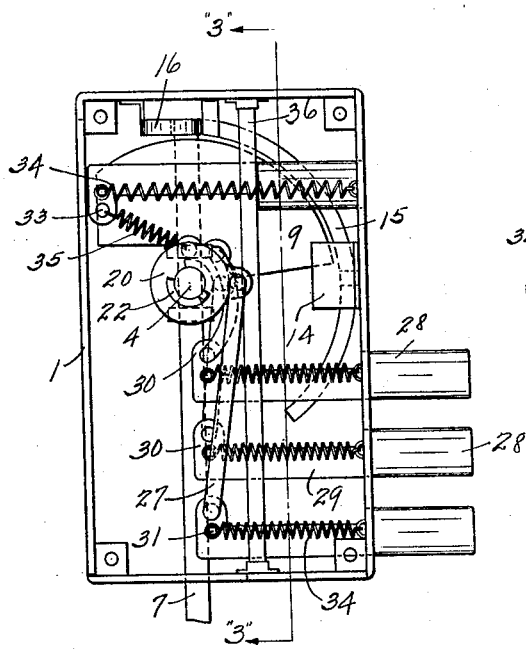
Figure 4:
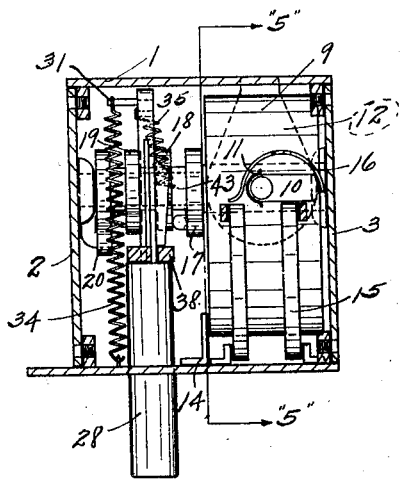
Figure 4 is a top plan view.
Figure 3:
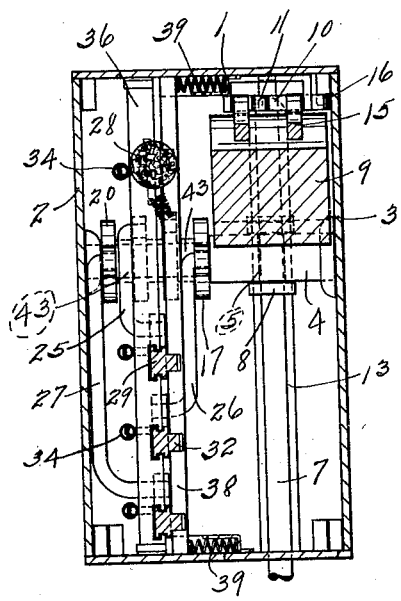
Figure 3 is a section on the line 3—3 of Figure 2.
Figure 5:
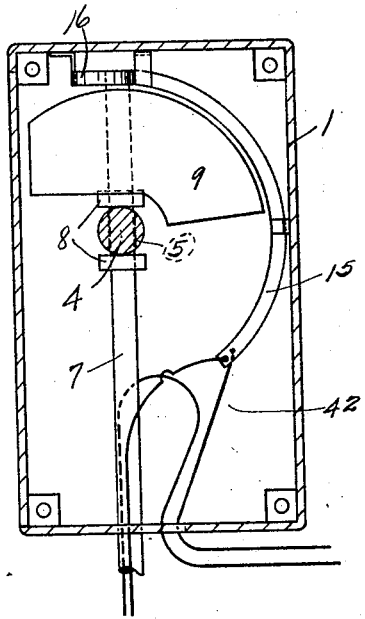
Figures 17, 18:
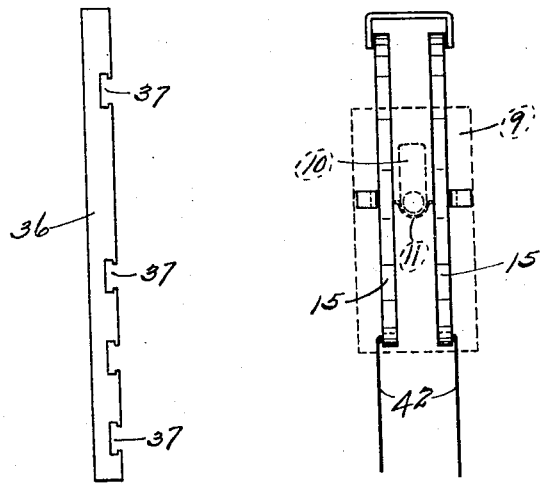
Figure 19:
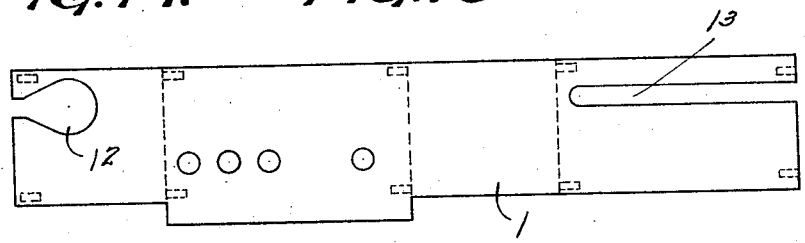

Figure 5 is a section on the line 5—5 of Figure 4;

Figure 6 is a detail of the arrow;

Figure 7 is a detail of the operating shaft;

Figure 8 is a detail of the semaphore shaft and balance weight;

Figures 9, 10, 11 and 12 are details of the lever collars;

Figures 13, 14 and 15 are details of the levers;

Figure 16 is a detail of a plunger;

Figure 17 is a detail of a guide post;

Figure 18 is a detail of the arcuate guides;

Figure 19 is a detail of the casing blank.

In carrying out this invention I provide a casing 1 having a front cover 2 and a rear cover 3. Journaled transversely within the casing 1 is an operating shaft 4 having a semaphore shaft aperture 5 provided therein and lugs 6 secured thereto in spaced relation on said shaft, three such lugs being shown positioned on one side of said shaft, and another lug on the other side thereof approximately 135 degrees from the first mentioned lugs, as shown in Figure 7, for a purpose as hereinafter described. A semaphore shaft 7 is journaled in the semaphore shaft aperture 5 of the operating shaft 4 and prevented from lateral movement in the said shaft 4 by means of set collars 8. A balance weight 9 is journaled upon the semaphore shaft 7. An arm 10 is rigidly secured to the semaphore shaft 7 above the balance weight 9. An aperture 12 is pierced in the bottom, and a slot 13 having the semaphore shaft 7 passed therethrough is pierced in the side, of the casing 1. A guide 14 is secured to the inner side of the casing 1 to provide a means for guiding the balance weight 9. A pair of spaced arcuate guides 15 are secured within the casing 1 above the balance weight 9, in such a manner as to permit the arm 10 of the semaphore shaft 7 to pass in between the said guides. A circular spring 16 is secured to the top of the casing 1. The said circular spring 16 engages the arm 10 in order to prevent the balance weight 9 from rattling upon the collar 8 and also to guide the said arm 10 back to its normal position when leaving the guides 15, whereby the said arm 10 is caused to rotate a quarter turn from the position the said arm 10 will take when lying between the guides 15, namely, parallel with the axis of said guides, to a position right angularly disposed to the axis of said guides, as shown in Figure 4, for a purpose as hereinafter described. Lever collars 17, 18, 19 and 20 having shaft apertures 21 of 195 degrees circumference and arcuate slots 22 of 165 degrees circumference pierced therein, are loosely mounted upon the operating shaft 4, the purpose of the said arcuate slots being to limit the rotation of the said shaft 4 relative to the collars as by engaging the said lugs 6 with the shoulders or stops formed by the ends of the said slots, whereby the said shaft may be rotated by rotating one of the said collars, without at the same time requiring the rotation of the other collars. The lever collars 18, 19, 20 are adapted to engage the aforesaid three lugs positioned on one side of the shaft 4, and thus are adapted to rotate the said shaft in one direction, but the lever collar 17 is adapted to engage the other lug on the other side of the shaft, as heretofore described, and is thus adapted to rotate the shaft in the other direction. Spacers 43 are mounted upon the shaft 4 between the lever collars 17, 18, 19 and 20. Arms 23 are incorporated in the lever collars 17, 18, 19, and 20. Apertures 24 are pierced in the arms 23. Levers 25, 26 and 27 engage the apertures 24 of the arms 23 of the lever collars 18, 19 and 20 respectively. Spring set plungers 29 having push buttons 28 attached thereto and also having ears 30, spring catches 31 and wedges 32 incorporated therein, are slidably mounted in vertical spaced relation in the casing 1. Apertures 33 are pierced in the ears 30 for engaging the levers 25, 26 and 27. Coil springs 34 are secured to the spring catches 31 and to the side of the casing 1. A coil spring 35 is secured in the aperture 33 of one of the plungers 29 and in the aperture 24 of the arm 23 of the lever collar 17. A guide post 36 having slots 37 cut therein slidably engages the plunger 29. A spring set post 38 slidably engages spring cages 29 secured to the top and to the bottom of the casing 1. The spring set post 38 is adapted to engage the wedges 32 for locking the plungers 29. The plunger 29 which has engagement with the lever collar 17 through the coil spring 35 is adapted for releasing the other plungers 29 which are in operating relationship with the operating shaft 4, when the said other plungers 29 are locked. An arrow 40 is secured to the arrow shaft 7. Clamps or brackets 44 are provided for securing the signal to a machine. When the signal is secured to a machine having a closed body, extensions are passed through the wall of the body and secured to the push buttons 28.

In operation one of the plungers 29 is in a locked position at all times. When desiring to give a signal, the push button 28 which has relation with the desired signal is pressed which causes the wedge 32 of the plunger 29 to engage the spring set post 38 and press it back until the said wedge 32 has cleared the spring set post 38, whereupon the said spring set post 38 comes back to its normal position and locks the plunger 29. When the wedge 32 presses the spring set post 38 back, the locked plunger 29 is released and drawn back by the coil spring 34 secured to the spring catch 31 incorporated in the said plunger 29 and to the side of the casing 1. When the button 28 of the desired signal is pressed, the lever which engages the ear 30 of the plunger 29, and the corresponding lever collar, draws the arm 23 of the said lever collar down, thereby turning the operating shaft 4 through the medium of the said lever collar and the lug 6 incorporated in the said shaft 4. When the said operating shaft 4 is turned, the semaphore shaft 7 which carries the arrow 40 and is journaled in the said shaft 4, is raised to the desired position. When the semaphore shaft 7 is raised the arm 10 which is secured to the said semaphore shaft 7 is turned and passed in between the guides 15, whereby the said arm 10 in passing from the position as shown in Figure 4, namely, at right angles to the axis of the guides 15, to its position when between the said guides and parallel to the axis thereof, will at the same time rotate the shaft 7 a quarter turn, so that the arrow 40 on the semaphore shaft 7 will lay parallel with and close against the side of the body of the vehicle (not shown) when in its vertical position as shown in Figure 1, but to take a position at right angles to said body when in its raised position, as shown by the dotted lines in Figure 1. At the same time, the weight 9, being journaled on the said shaft 7, will maintain its vertical alignment as heretofore described, being guided by the guide 14 aforesaid. If desired, the arcuate guides 15 may be made of conductive material and connected with an electrical circuit as at 42; a contact 11 may be insulatably mounted on the arm 10, and a light 41 may be mounted on the semaphore shaft 7, and connected to the contact 11 and the circuit 42, but these features are not claimed as a part of my invention. By the means described the light 41 will be illuminated when the semaphore shaft 7 is in an indicating position, but will not be illuminated when the semaphore shaft is in its vertical position. The aperture 12 is provided for the purpose of passing the wires of the circuit 42 through the wall of the casing.

While I have herein described a certain specific method of constructing and assembling the elements of my invention, it is understood same may be varied in minor details, not departing from the spirit of my invention as defined in the appended claims.

I claim:

1. In a traffic signal, having a casing provided with suitable apertures, an operating shaft journaled transversely in said casing and a semaphore shaft mounted through the casing, the combination comprising said semaphore shaft journaled transversely in said operating shaft, a balance weight journaled on said semaphore shaft, an arm rigidly secured to said semaphore shaft, spaced guides secured in said casing, and means for causing said arm to take a position right angularly to said guides when disengaged therefrom, but to take a position parallel to said guides when therein between engaged, whereby said semaphore shaft may be turned through a right angle without turning the balance weight.

2. In a traffic signal, having a casing provided with suitable apertures, an operating shaft journaled transversely in said casing, and a semaphore shaft mounted through the casing, said semaphore shaft having an arrow at one end and a balance weight at the other end, the combination comprising said semaphore shaft journaled transversely in said operating shaft, said balance weight being journaled on said semaphore shaft oppositely of said arrow, an arm rigidly secured to said semaphore shaft outwardly of said balance weight, spaced arcuate guides secured in said casing, a circular element positioned at one end of said arcuate guides and adapted to engage said arm so as to cause said arm to take a position right angularly to said guides when disengaged therefrom but to take a position parallel to said guides when therein between engaged, whereby said semaphore shaft may be turned through a right angle, without turning said balance weight.

3. In a traffic signal, having a casing provided with suitable apertures, an operating shaft journaled transversely in said casing, and a semaphore shaft mounted through the casing, said semaphore shaft having an arrow at one end and a balance weight at the other end, the combination comprising said semaphore shaft journaled transversely in said operating shaft, said balance weight being journaled on said semaphore shaft oppositely of said arrow, a plurality of lugs positioned in spaced relation on said operating shaft, a plurality of lever collars journaled on said operating shaft and registering with said lugs, each of said lever collars having an arcuate slot engaging one of said lugs whereby any one of said collars is adapted to rotate said operating shaft as by engaging said lug, one of said collars being adapted to rotate said operating shaft in one direction and the others of said collars being adapted to rotate said operating shaft in the other direction, spring set plungers slidably mounted in vertical spaced relation in said casing, a wedge mounted on the side of each of said plungers, a spring set vertically extending latch bar adapted to engage any one of said wedges so as to lock any one of said plungers when said plunger is moved inwardly of said casing whereby said latch bar will also be disengaged from any of the other wedges so as to unlock any of the other plungers, means connecting each of said plungers to one of said lever collars, whereby the said inward movement of said plunger will rotate said collar so as to engage said lug and rotate said operating shaft, and means for causing said rotation of said operating shaft to rotate said semaphore shaft through a right angle.

4. In combination with a traffic signal as described in claim 3, means for causing the rotation of said semaphore shaft, said means comprising spaced arcuate guides secured in said casing, an arm secured to said semaphore shaft outwardly of said balance weight, a circular element positioned at one end of said arcuate guides and adapted to engage said arm so as to cause said arm to take a position right angularly to said guides when disengaged therefrom, but to take a position parallel to said guides when therein between engaged, whereby said semaphore shaft will be turned through a right angle.

In testimony whereof I affix my signature.

OLIVER RAYMOND DINSMORE.